United States Patent [19]

Cholet et al.

[11] 4,294,328
[45] Oct. 13, 1981

[54] DEVICE FOR EMITTING ACOUSTIC WAVES IN A LIQUID MEDIUM BY IMPLOSION

[75] Inventors: Jacques Cholet, L'Etang la Ville; Pierre Magneville, Vernouillet; Jean Cassand, Royan, all of France

[73] Assignee: Institut Francais du Petrole, Rueil-Malmaison, France

[21] Appl. No.: 76,646

[22] Filed: Sep. 18, 1979

[30] Foreign Application Priority Data

Sep. 18, 1978 [FR] France ................. 78 26882

[51] Int. Cl.$^3$ ........................... G01V 1/38
[52] U.S. Cl. ..................... 181/120; 367/146; 137/102
[58] Field of Search ............... 181/110, 120; 367/146; 137/102

[56] References Cited

U.S. PATENT DOCUMENTS

| Re. 26,748 | 12/1969 | Schempf | 367/146 |
|---|---|---|---|
| 3,792,425 | 2/1974 | Magneville et al. | 181/120 |
| 3,833,087 | 9/1974 | Cholet | 181/120 |
| 3,850,082 | 11/1974 | Nussbaumer | 137/102 |
| 3,997,022 | 12/1976 | Cholet | 181/120 |
| 4,041,970 | 8/1977 | Peters | 137/102 |
| 4,114,515 | 9/1978 | Pauliukonis | 137/102 |
| 4,196,788 | 4/1980 | Sclard | 181/120 |
| 4,203,501 | 5/1980 | Cholet et al. | 181/120 |

Primary Examiner—Nelson Moskowitz
Attorney, Agent, or Firm—Millen & White

[57] ABSTRACT

The device includes two movable members interconnected at their periphery by a flexible membrane defining therewith a tight enclosure of variable volume, a piston slidable in a cylinder integral with one of the two movable members and hydraulically actuated, to move the members apart from each other, a second cylinder separated in two compartments by an inner valve and controlling the actuation of the piston in response to the pressure of the water feeding said second cylinder, two apertures intermittently freed by the valve for releasing the piston and at least one aperture for the discharge of the water from the tight enclosure to the external water body when the piston release allows the two movable members to be urged toward each other, thereby producing an implosion which generates a strong sonic wave.

8 Claims, 4 Drawing Figures

DEVICE FOR EMITTING ACOUSTIC WAVES IN A LIQUID MEDIUM BY IMPLOSION

BACKGROUND OF THE INVENTION

The invention relates to a device for emitting acoustic waves by implosion, particularly adapted to marine seismic prospection.

Known devices for emitting acoustic waves by implosion comprise two members movable with respect to each other, defining with at least one flexible membrane interconnecting them at their periphery, a tight enclosure inside which prevails a pressure lower than the external pressure and, preferably, a very small pressure, associated to means for moving the movable members away from each other, said means comprising a cylinder integral with one of said movable members and a piston slidably mounted therein and adapted to push the other movable member upon actuation of a hydraulic system, up to a spaced apart position where it is maintained intermittently by locking means. The fluid compressed by the hydraulic system acts on the piston either directly or through a movable mechanical part taking its bearing intermittently on the piston and driving it toward the spaced apart position of the movable members.

The hydraulic feeding system of the device comprises means for pressurizing a fluid, e.g. oil, and operated in closed loop. Since the emitting device may have to be towed by a ship while immersed, over a relatively long distance, the total length of the lines for feeding the device with pressurized fluid and returning the latter to the ship may be very substantial.

SUMMARY OF THE INVENTION

The device according to the present invention comprises two members movable with respect to each other from a spaced apart position and a position of closeness. The two movable members are interconnected at their periphery through at least one flexible membrane, defining with the latter a tight enclosure of variable volume. It also comprises means for moving the two movable members away from each other and to maintain them intermittently in a spaced apart relationship, said means comprising a cylinder integral with one of the movable members wherein slides a piston provided with a rod adapted to come in contact with a wall integral with the other movable member, and a distributing system for applying onto the piston an intermittent thrust, said system comprising a second cylinder, in a fixed position with respect to the first cylinder, and means for pressurizing a fluid.

The device is remarkable in that the second cylinder comprises a first compartment and a second compartment intermittently communicating with the first one through a first aperture, and with the first cylinder through a second aperture and communicating permanently with the external medium through at least a third aperture. The distribution system for applying onto the piston an intermittent thrust comprises a valve having a head and a rod of smaller section than the head. This valve is movable from first position where the head and the end of the rod respectively close the first and the second aperture of the second compartment, and a second position where the first and the second apertures are open. In addition, a channel is provided throughout the valve and parallel to its axis of displacement. The distribution system also comprises means to intermittently feed, with pressurized fluid, the interior of the first compartment of the second cylinder and to intermittently establish communication with the external medium. This means is made up of, for example, a two-way slide valve distributor.

The use of a distribution system, which is open to the external medium which acts as low pressure fluid, enables elimination of the return line when the source of pressurized fluid is placed on the towing ship. The accomodation of the feeding circuit and the source of pressurized fluid onto a floating platform or a float which is towed while submerged, is made easier, due to the fact that the fluid to be pressurized is directly withdrawn from the external medium.

In the case of a seismic source actuated in a water body, a substantial advantage of the invention consists in making use of this water as hydraulic fluid, however, air may also be used.

In addition, no intermediary mechanical part is required for pushing the piston towards the spaced apart position of the movable member, in contrast with the prior devices.

BRIEF DESCRIPTION OF THE DRAWINGS

Other characteristics and advantages will be made apparent from the following description of a non-limitative embodiment of the device and with reference to the accompanying drawings wherein.

DETAILED DISCUSSION OF THE INVENTION

Figure 1:
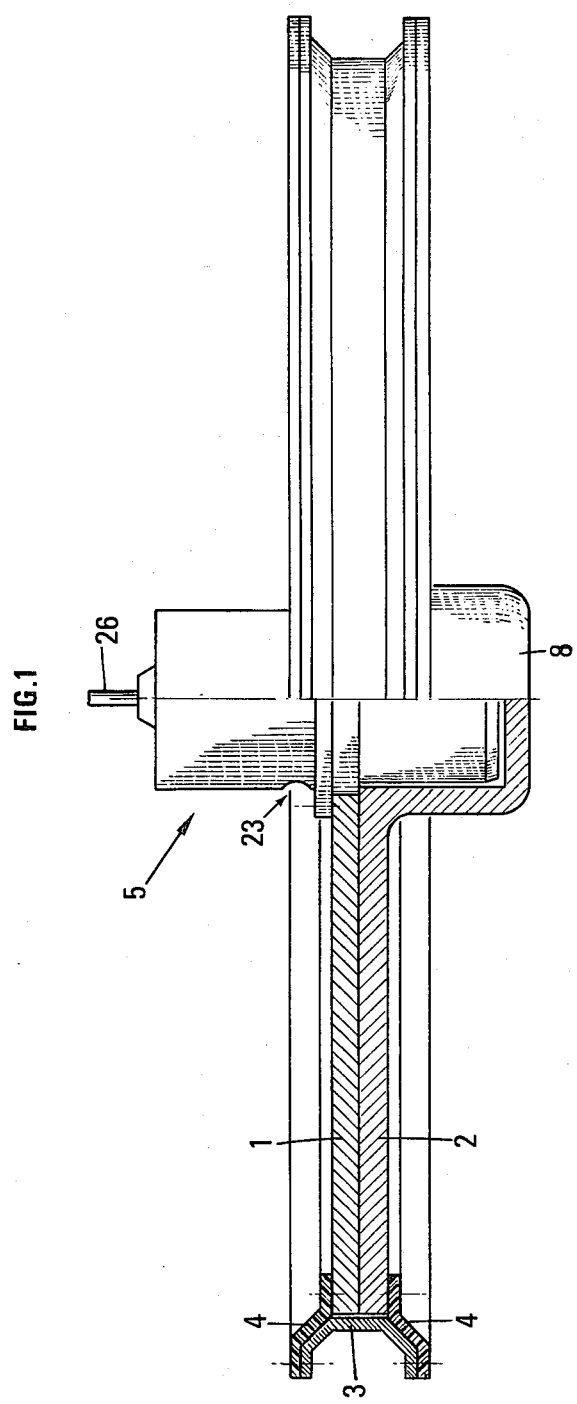
FIG. 1 diagrammatically shows the whole device partially in cross-section.

In these figures, the two movable members 1 and 2 consist of circular plates. An annular flange 3 is provided at their periphery. Two annular bands 4, made of flexible material, are secured respectively to the flange 3 and to one of the two plates 1 and 2. The assembly of the two plates 1 and 2, the annular flange 3 and the annular bands 4, forms a substantially tight enclosure whose volume may vary when the movable members are moved away from each other by the action of the distribution system 5, shown with more details on figures 2, 3 and 4. A pressure lower than the hydrostatic pressure at the depth of use is established in the enclosure. In order to enhance the efficiency of the device, a vacuum is preferably created in the enclosure.

Figure 2:
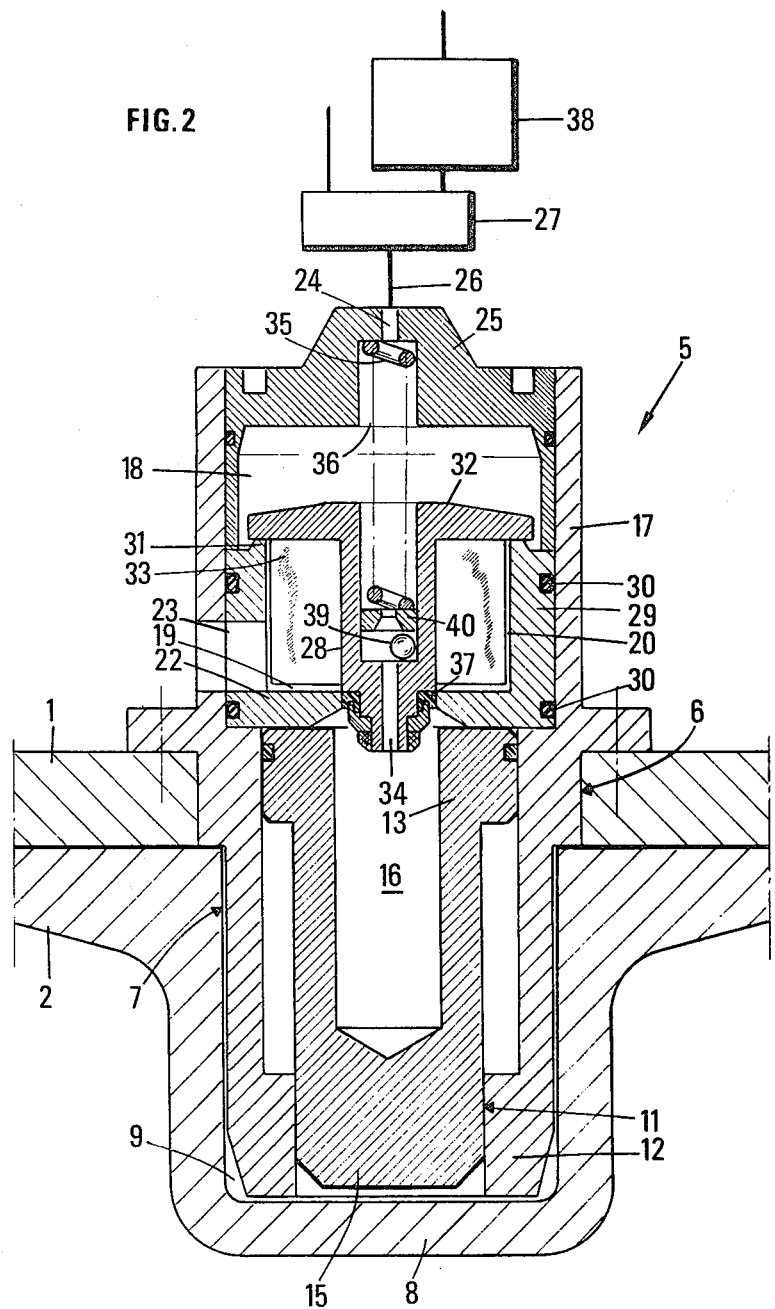
FIG. 2 is a diagrammatic partial cross-section view of the device of FIG. 1, illustrating the arrangement of the distribution circuit, the movable members being in closeness relationship.
Figure 3:
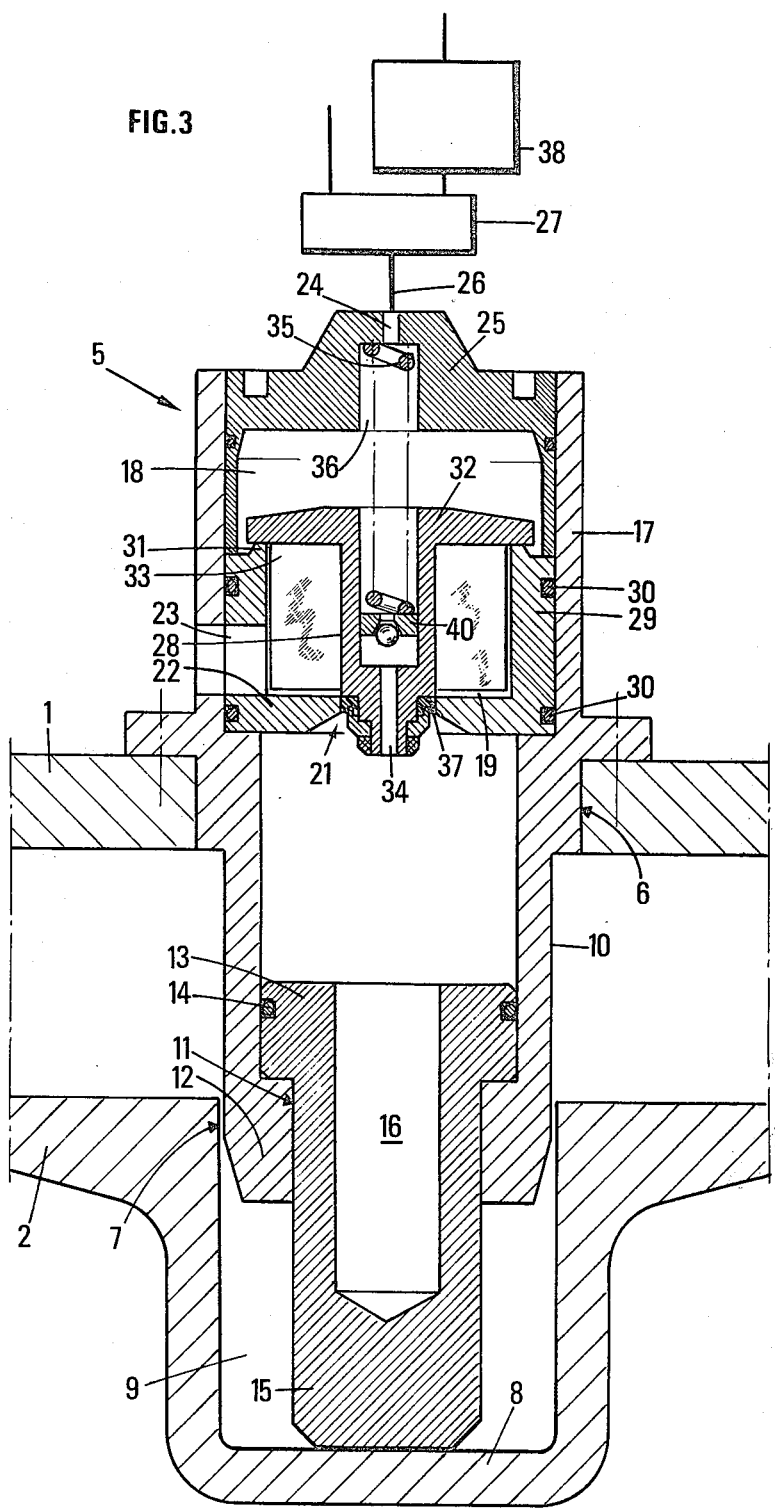
FIG. 3 shows is a diagrammatic partial cross-section view of the device of FIG. 1, illustrating the arrangement of the distribution system, the movable members being in spaced apart position.
Figure 4:
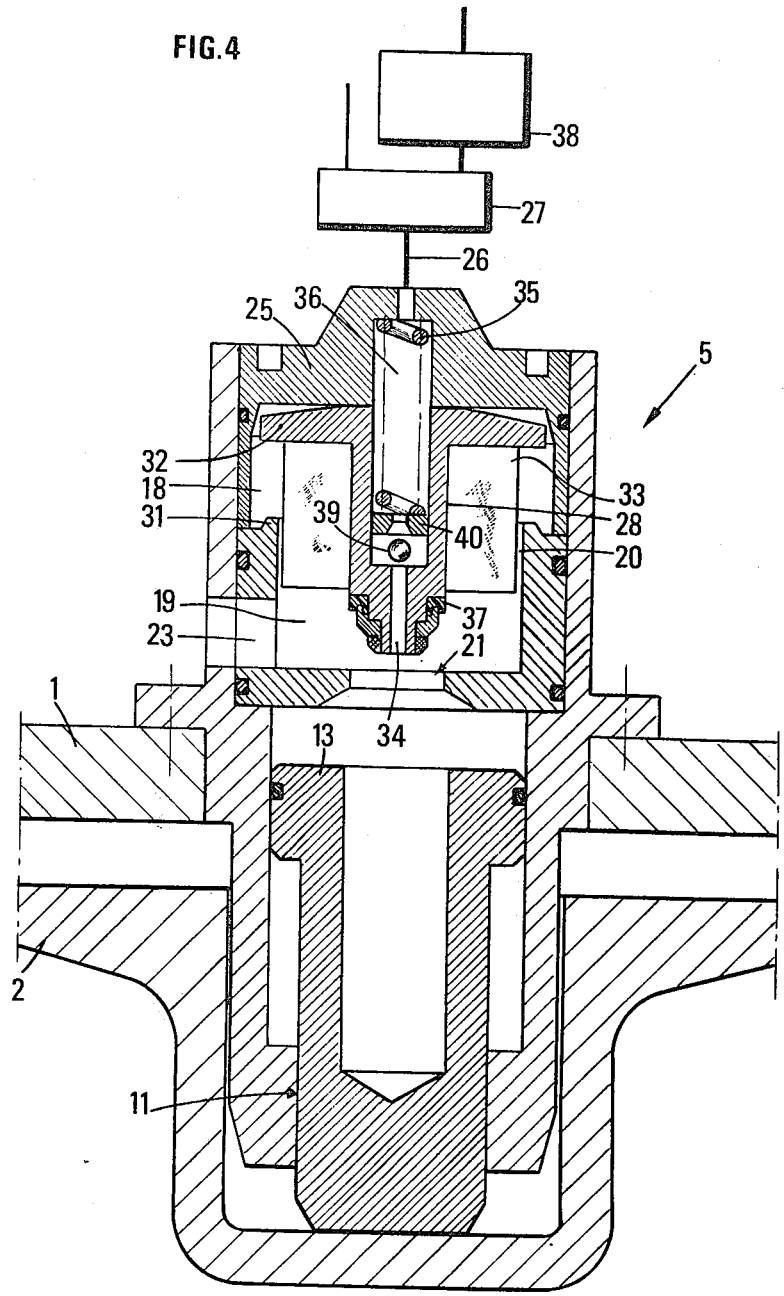
FIG. 4 is a diagrammatic partial cross-section view of the device showing an arrangement of the distribution system, the movable members being in a position intermediate between the spaced apart position and the position of close proximity.

The plate 1 includes an opening 6 in its central portion (FIGS. 2, 3 and 4). The plate 2 has in its central part, a hollow protruding portion 8 communicating with the inside of the enclosure through an aperture 7 facing the opening 6 of plate 1. The space 9 defined by the wall of the hollow portion 8 thus forms an extension of the inner cavity defined by the movable members. A first cylinder 10 is secured for example, to the external wall of plate 1. The cylinder 10 passes through the opening 6 thereof and fits in the opening 7 of the hollow portion 8 of the plate 2. The cylinder has an opening 11 extending through its end wall 12 facing the bottom of the hollow portion 8.

In the cylinder slides a piston 13 provided with sealing joints 14 at its periphery and having a rod 15 passing through the opening 11 and adapted to come in abutment against the bottom of the hollow portion 8. The stroke of portion 13 inside the cylinder 10 is at least equal to the maximum spacing between the two plates 1 and 2.

An axial cavity 16 opening inside the cylinder 10 may be arranged in piston 13 for the purpose of reducing its weight. At the end of the first cylinder 10 opposite to opening 11 is arranged a second cylinder 17 integral therewith, forming a first element of the distribution system. Inside the second cylinder there are a first compartment 18 and a second compartment 19 communicating with each other through a first aperture 20. The latter compartment, whose cross-section is smaller than that of the first compartment, is formed, in the selected embodiment, by introducing inside the second cylinder, up to the bottom thereof, an annular piece 29 comprising on its external wall a housing for sealing joints 30 and whose terminal wall closest to the first compartment comprises a valve seat 31. The second compartment 19 further communicates with the first cylinder 10 through a second aperture 21 (FIGS. 3 and 4). The latter is arranged in a wall 22 which is integral with the annular piece 29 and separating the two cylinders which, in this embodiment, are made in one piece.

The second compartment 19 further comprises at least a third aperture 23, arranged through the side wall of the second cylinder 17 and that of the annular piece 29.

The frst compartment 18 communicates, through an aperture 24, provided in the terminal wall 25 of the second cylinder opposite to the partition 22, and through a line 26, with a two-way distributor 27 forming a second element of the distribution system.

A valve, forming a third element of the distribution system, comprises a rod 28 which is accomodated in the second cylinder 17 and adapted to move in the direction of the longitudinal axis thereof and a valve head 32 having a diameter at least equal to that of the valve seat 31 and the valve head 32 is adapted to move in the first compartment 18.

The length of the valve rod 28 is such that, when the valve head 32 abuts against its seat 31, the free end of the rod closes the aperture 21 by means of a sealing annular joint 37. In this position, the two apertures 20 and 21 are closed (FIG. 3).

The valve rod 28 is guided over its stroke by guiding members 33 which are integral therewith, which slide during the valve motion along the internal wall of the annular piece 29.

Throughout the valve body, along its longitudinal axis, is provided a channel 34 comprising an enlarged portion towards the head 32. At the bottom of this enlarged portion are arranged a non-return valve 39 and its seat 40. This enlarged portion also houses a spring 35 having one end engaged in a recess 36 in the bottom 25 of the second cylinder and the other end bearing against the seat 40 of the non-return valve 39. This spring is slightly compressed so as to always urge the valve head 32 against its seat 31.

The opening 24 of the end wall will be advantageously arranged in the bottom of the recess 36. The two-way distributor 27 is adapted to put in communication channel 26 alternatively with a source of pressurized fluid 38, placed on the ship or, for example, on an installation which is towed, while immersed, by the ship and with the external medium wherein the device is immersed.

Accordingly to the preferred embodiment, the cylinders 10 and 17 are made in a single piece, however, they may be replaced by two cylinders each comprising an end wall, these two cylinders being rigidly secured to each other.

Finally, the device may advantageously comprise a plate, not shown on the figures, made of a damping material, arranged between the two movable members in order to damper, to a certain extent, the shock produced when they urged against each other.

The device is operated as follows:

When the two movable members 1 and 2 are in close proximity, as shown in FIG. 2 the distributor 27 is actuated to feed with pressurized water, through channel 26, the first compartment 18 of the second cylinder 17 and, through channel 34, the cylinder 10.

The water pressure acts on the head of the valve 32 and 20 on the end of the valve rod 28, thereby producing opposite forces, however, since the surface of the valve head is greater than that of the end of rod 28, the corresponding force exerted on the head of the valve 32 is greater than that exerted on the end of the rod 28, this having the effect of urging the valve head 32 against its seat 31, and of maintaining the rod 28 engaged in the aperture 21 and, by means of joint 37, of tightly closing said aperture. The pressure may then be applied onto piston 13, thereby moving the movable members 1 and 2 away from each other (FIG. 3).

In order to trigger the device, the communication established by distributor 27 is reversed, so as to put in communication the low pressure external medium with compartment 18 and thereby, because of the non-return valve 39, an abrupt pressure drop is produced in said compartment, thereby reducing the force exerted on the valve head 32, said force then becoming lower than that applied on the end of the rod 28. The valve head 32 then moves away from its seat and the pressure becomes equal in compartments 18 and 19. The force which is exerted on the valve head 32 is then nullified, which accelerates the motion of the valve towards the bottom 25 of cylinder 17 and thus clears the aperture 21.

The pressure in cylinder 10 then becomes equal to that of the external medium and the force exerted by the hydrostatic pressure onto the movable members 1 and 2, is no longer balanced by the pushing force of piston 13. The movable members are then abruptly urged towards each other while repelling said piston which expells water from cylinder 10 to the external medium through the aperture 23.

At the moment of the impact of the two members, a strong sonic wave is generated.

We claim:

1. A device for emitting acoustic waves in a water medium by implosion, comprising first and second members movable with respect to each other from a spaced apart position to a position of closeness, said first and second movable members being interconnected at their periphery by at least one flexible membrane which defines therewith a tight enclosure of variable volume, moving means for moving said first and second movable members apart from each other and intermittently maintaining them in a spaced apart relationship, said moving means comprising a first cylinder secured to one of said first and second movable members, a piston slidable in said first cylinder and provided with a rod adapted for coming in contact with a wall which is integral with the other of said first and second members, and a system for distributing pressurized fluid in order to exert on said piston an intermittent pushing force, said system comprising a second cylinder of fixed position with respect to said first cylinder and a source of pressurized fluid, said second cylinder including a first component, and a second compartment which is in communication intermittently with said first compartment through a first aperture, with said first cylinder through a second aperture, and permanently in communication with an external medium through at least one third aperture, and said distribution system comprising a valve having a valve rod of smaller section than that of the valve head and movable from a first position wherein the valve head and the end of said valve rod respectively close substantially tightly said first and said second apertures of said second compartment and a second position where said first and second apertures are opened, a channel being provided throughout said valve and in a direction parallel to its longitudinal axis, for feeding with pressurized fluid said first cylinder, intermittent feeding means for intermittently feeding with pressurized fluid the interior of said first compartment of said second cylinder and maintaining means for maintaining intermittently the pressurized fluid in said first cylinder.

2. A device according to claim 1, characterized in that said first aperture of said second compartment is defined by an annular protrusion of the lateral inner surface of said second cylinder, said annular protrusion comprising a seat for the valve head, the valve head being adapted to move entirely within said first compartment.

3. A device according to claim 2, characterized in that it comprises force means for permanently applying to said valve a force which tends to move it towards said first position.

4. A device according to claim 1, characterized in that said intermittent feeding means for intermittently feeding with pressurized fluid the interior of said first compartment, of said second cylinder, comprises a two-way distributor having a first passage of communication with a pressurized water source and a second passage of communication with the external medium.

5. A device according to claim 1, characterized in that a layer of damping material is arranged between said first and second movable members.

6. A device according to claim 3, characterized in that the means for permanently applying onto the valve a force which tends to move it towards said first position, comprises a spring compressed between the inner wall of the head of the second cylinder and the valve head.

7. A device according to claim 1, characterized in that said maintaining means for maintaining intermittently the pressurized fluid in said first cylinder comprises a non-return valve located in the channel feeding said first cylinder with pressurized fluid.

8. A device according to claims 6 or 7, characterized in that said non-return valve is placed in a housing arranged for said spring in the valve head and said spring bears on said non-return valve.

* * * * *